(12) United States Patent
Yavitz

(10) Patent No.: US 6,210,169 B1
(45) Date of Patent: *Apr. 3, 2001

(54) DEVICE AND METHOD FOR SIMULATING OPHTHALMIC SURGERY

(75) Inventor: Edward Q. Yavitz, Rockford, IL (US)

(73) Assignee: LaserSight Technologies, Inc., Winter Park, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,888

(22) Filed: Jan. 31, 1997

(51) Int. Cl.[7] ............................. G09B 23/28; A61B 18/18
(52) U.S. Cl. ................................. 434/271; 606/5
(58) Field of Search ........................ 434/271; 606/4, 606/5, 11

(56) References Cited

U.S. PATENT DOCUMENTS

| | | |
|---|---|---|
| 2,480,737 | 8/1949 | Jayle . |
| 3,074,407 | 1/1963 | Moon . |
| 3,476,112 | 11/1969 | Elstein . |
| 3,697,889 | 10/1972 | Dewey, Jr. . |
| 3,743,965 | 7/1973 | Offner . |
| 3,848,104 | 11/1974 | Locke . |
| 3,938,058 | 2/1976 | Yamamoto . |
| 3,982,541 | 9/1976 | L'Esperance, Jr. . |
| 3,983,507 | 9/1976 | Tang et al. . |
| 4,169,663 | 10/1979 | Murr . |
| 4,180,751 | 12/1979 | Ammann . |
| 4,349,907 | 9/1982 | Campillo et al. . |
| 4,386,428 | 5/1983 | Baer . |
| 4,423,728 | 1/1984 | Lieberman . |
| 4,461,294 | 7/1984 | Baron . |
| 4,477,159 | 10/1984 | Mizuno et al. . |
| 4,520,816 | 6/1985 | Schachar et al. . |
| 4,526,171 | 7/1985 | Schachar . |
| 4,538,608 | 9/1985 | L'Esperance, Jr. . |
| 4,546,773 | 10/1985 | Kremer et al. . |
| 4,573,467 | 3/1986 | Rich et al. . |
| 4,580,559 | 4/1986 | L'Esperance, Jr. . |
| 4,598,714 | 7/1986 | Kremer et al. . |
| 4,619,259 | 10/1986 | Graybill et al. . |
| 4,633,866 | 1/1987 | Peyman et al. . |
| 4,653,495 | 3/1987 | Nanaumi . |
| 4,662,370 | 5/1987 | Hoffman et al. . |
| 4,665,913 | 5/1987 | L'Esperance, Jr. . |
| 4,669,466 | 6/1987 | L'Esperance, Jr. . |
| 4,688,570 | 8/1987 | Kramer et al. . |
| 4,693,600 * | 9/1987 | Cross et al. ........................ 356/121 |
| 4,718,418 | 1/1988 | L'Esperance, Jr. . |
| 4,720,189 | 1/1988 | Heyman et al. . |
| 4,721,379 | 1/1988 | L'Esperance, Jr. . |
| 4,729,372 | 3/1988 | L'Esperance, Jr. . |
| 4,729,373 | 3/1988 | Peymen . |
| 4,732,148 | 3/1988 | L'Esperance, Jr. . |
| 4,764,930 | 8/1988 | Bille et al. . |

(List continued on next page.)

OTHER PUBLICATIONS

D. Eimerl, L. Davis, & S. Vlesko, Optical, mechanical, and thermal properties of barium borate, Journal of Applied Physics, Sep. 1987, pp. 1968–1983.

(List continued on next page.)

Primary Examiner—Robert A. Hafer
Assistant Examiner—John Edmund Rovnak
(74) Attorney, Agent, or Firm—William H. Bollman; Farkas & Manelli PLLC

(57) ABSTRACT

A device for simulating ophthalmic surgery is disclosed which comprises a laser for generating a laser beam, an array for sensing whether the laser beam has been projected at the array, and a computer system operatively connected to the laser and the array, the computer system for actuating the laser, for determining whether the array has sensed the laser beam, and for creating an ablation profile based upon whether the array has sensed the laser beam.

28 Claims, 3 Drawing Sheets

U.S. PATENT DOCUMENTS

| | | |
|---|---|---|
| 4,770,172 | 9/1988 | L'Esperance . |
| 4,773,414 | 9/1988 | L'Esperance, Jr. . |
| 4,784,135 | 11/1988 | Blum et al. . |
| 4,798,204 | 1/1989 | L'Esperance, Jr. . |
| 4,807,623 | 2/1989 | Lieberman . |
| 4,838,266 | 6/1989 | Koziol et al. . |
| 4,838,679 | 6/1989 | Bille . |
| 4,840,175 | 6/1989 | Peyman . |
| 4,848,340 | 7/1989 | Bille et al. . |
| 4,856,513 | 8/1989 | Muller . |
| 4,862,886 | 9/1989 | Clarke et al. . |
| 4,896,015 | 1/1990 | Taboada et al. . |
| 4,903,695 | 2/1990 | Warner et al. . |
| 4,907,586 | 3/1990 | Bille et al. . |
| 4,911,711 | 3/1990 | Telfair et al. . |
| 4,925,523 | 5/1990 | Braren et al. . |
| 4,941,093 | 7/1990 | Marshall et al. . |
| 4,968,130 | 11/1990 | Hideshima et al. . |
| 4,975,918 | 12/1990 | Morton . |
| 4,993,826 | 2/1991 | Yoder . |
| 4,994,058 | 2/1991 | Raven et al. . |
| 5,019,074 | 5/1991 | Muller . |
| 5,049,147 * | 9/1991 | Danon ................................. 606/10 |
| 5,052,004 | 9/1991 | Gratze et al. . |
| 5,063,942 | 11/1991 | Kilmer et al. . |
| 5,065,046 | 11/1991 | Guyer . |
| 5,066,294 * | 11/1991 | Cosmescu ............................ 606/11 |
| 5,074,859 | 12/1991 | Koziol . |
| 5,102,409 | 4/1992 | Balgorod . |
| 5,108,388 | 4/1992 | Trokel . |
| 5,108,412 | 4/1992 | Krumeich et al. . |
| 5,133,726 | 7/1992 | Ruiz et al. . |
| 5,144,630 | 9/1992 | Lin . |
| 5,163,934 | 11/1992 | Munnerlyn . |
| 5,163,936 | 11/1992 | Black et al. . |
| 5,182,759 | 1/1993 | Anthon et al. . |
| 5,188,631 | 2/1993 | L'Esperance, Jr. . |
| 5,196,006 | 3/1993 | Klopotek et al. . |
| 5,207,668 | 5/1993 | L'Esperance, Jr. . |
| 5,217,452 | 6/1993 | O'Donnell . |
| 5,219,343 | 6/1993 | L'Esperance, Jr. . |
| 5,219,344 | 6/1993 | Yoder, Jr. . |
| 5,222,960 | 6/1993 | Poley . |
| 5,226,903 | 7/1993 | Mizuno . |
| 5,250,062 | 10/1993 | Hanna . |
| 5,257,988 | 11/1993 | L'Esperance, Jr. . |
| 5,263,950 | 11/1993 | L'Esperance, Jr. . |
| 5,267,013 * | 11/1993 | Spence ................................. 356/121 |
| 5,284,477 | 2/1994 | Hanna et al. . |
| 5,288,292 | 2/1994 | Giraud et al. . |
| 5,290,301 | 3/1994 | Lieberman . |
| 5,312,320 | 5/1994 | L'Esperance, Jr. . |
| 5,324,281 | 6/1994 | Muller . |
| 5,334,190 | 8/1994 | Seiler . |
| 5,336,217 | 8/1994 | Buys et al. . |
| 5,345,534 | 9/1994 | Najm et al. . |
| 5,349,590 | 9/1994 | Amirkhanian et al. . |
| 5,350,374 | 9/1994 | Smith . |
| 5,353,262 | 10/1994 | Yakymyshyn et al. . |
| 5,360,424 | 11/1994 | Klopotek . |
| 5,363,388 | 11/1994 | Shi et al. . |
| 5,364,388 | 11/1994 | Koziol . |
| 5,370,641 | 12/1994 | O'Donnell, Jr. . |
| 5,387,106 * | 2/1995 | Mackenzie et al. ................ 434/271 |
| 5,395,356 | 3/1995 | King et al. . |
| 5,395,362 | 3/1995 | Sacharoff et al. . |
| 5,405,355 | 4/1995 | Peyman et al. . |
| 5,411,501 | 5/1995 | Klopotek . |
| 5,423,801 | 6/1995 | Marshall et al. . |
| 5,425,727 | 6/1995 | Koziol . |
| 5,425,729 | 6/1995 | Ishida et al. . |
| 5,437,658 | 8/1995 | Muller et al. . |
| 5,441,511 | 8/1995 | Hanna . |
| 5,442,487 | 8/1995 | Mizuno . |
| 5,445,633 | 8/1995 | Nakamura et al. . |
| 5,461,212 | 10/1995 | Seiler et al. . |
| 5,464,960 * | 11/1995 | Hall et al. ......................... 219/121.6 |
| 5,470,329 | 11/1995 | Sumiya . |
| 5,474,548 | 12/1995 | Knopp et al. . |
| 5,480,396 | 1/1996 | Simon et al. . |
| 5,505,723 | 4/1996 | Muller . |
| 5,507,741 | 4/1996 | L'Esperance, Jr. . |
| 5,507,799 | 4/1996 | Sumiya . |
| 5,520,679 | 5/1996 | Lin . |
| 5,549,597 | 8/1996 | Shimmick et al. . |
| 5,556,395 | 9/1996 | Shimmick et al. . |
| 5,582,752 | 12/1996 | Zair . |
| 5,599,340 * | 2/1997 | Simon et al. ............................ 606/4 |
| 5,606,418 * | 2/1997 | Borden et al. ...................... 356/364 |
| 5,613,965 | 3/1997 | Muller . |
| 5,624,436 * | 4/1997 | Nakamura et al. .................. 606/12 |
| 5,632,742 * | 5/1997 | Frey et al. ............................ 606/12 |
| 5,634,920 | 6/1997 | Hohla . |
| 5,637,109 | 6/1997 | Sumiya . |
| 5,646,791 | 7/1997 | Glockler . |
| 5,651,784 | 7/1997 | Klopotek . |
| 5,681,490 * | 10/1997 | Chang ............................. 219/121.64 |
| 5,683,379 | 11/1997 | Hohla . |
| 5,684,562 | 11/1997 | Fujieda . |
| 5,711,762 | 1/1998 | Trokel . |
| 5,713,892 | 2/1998 | Shimmick . |
| 5,713,893 * | 2/1998 | O'Donnell, Jr. ...................... 606/10 |
| 5,735,843 | 4/1998 | Trokel . |
| 5,738,679 * | 4/1998 | Daikuzono ............................ 606/11 |
| 5,782,822 | 7/1998 | Telfair et al. . |
| 5,843,070 * | 12/1998 | Cambier et al. ....................... 606/2 |
| 5,849,006 | 12/1998 | Frey et al. . |
| 5,865,830 | 2/1999 | Parel et al. . |
| 5,909,380 * | 6/1999 | Dubois et al. ...................... 364/578 |

OTHER PUBLICATIONS

J.T. Lin, Non–linear crystals for tunable coherent sources, Optical and Quatum Electronics, 1990, pp. S283–S313.

J.T. Lin, Temperature–tuned noncritically phase–matched frequency conversion in LiB305 crystal, Optics Communications, Dec. 1990, pp. 159–165.

Y. Tanaka, H. Kuroda, & S. Shionoya, Generation of Tunable Picsecond Pulses in the Ultraviolet Region Down to 197nm, May 1982, pp. 434–436.

Barraquer, "Lamellar Keratoplasty (special techniques)" Annals of Ophthalmology, Jun. 1972, pp. 437–469.

Burnett, "Company Denies Delay in Approval for Laser", Orlando Sentinel, Feb. 1993, pp. 12–13.

Burnett, "Medical Technology", Orlando Sentinel, Feb. 1993, pp. 1–5.

Gailitis et al., "Solid State Ultraviolet Laser (213 nm) Ablation of the Cornea and Synthetic Collagen Lenticules", Lasers in Surgery and Medicine, Dec. 1991, pp. 556–562.

Gartry et al., "Excimer Laser Photorefractive Keratectomy", Ophthalmology, Aug. 1992, pp. 1210–1219.

Gilbert, "Corneal Topography: In Search of the Excimer Islands", Eye Care Technology, Oct. 1993, pp. 23–28.

L'Esperance, "New Laser Systems, Their Potential Clinical Usefulness, and Investigative Laser Procedures", Ophthalmic Lasers, 1989, pp. 995–1045.

Lin et al, "Corneal Topography Following Excimer Photorefractive Kerectomy for Myopia", Journal of Cataract Refractive Surgery, 1993, pp. 149–154.

Lin et al, "A Multiwavelength Solid State Laser for Ophthalmic Applications", Ophthalmic Technolgies, Jun. 1992, pp. 266–275.

Marguerite B. McDonald et al, "Central Photorefractive Keratectomy for Myopia", Ophthalmology, Sep. 1991, pp. 1327–1337.

Marshall et al, "Long–term Healing of the Central Cornea after Photorefractive Keratectomy Using an Excimer Laser", Oct. 1998, pp. 1411–1421.

Marshall et al, "Photoablative Reprofiling of the Cornea Using an Excimer Laser: Photorefractive Keratectomy", Lasers in Ophthalmology, Jan. 1986, pp. 21–48.

Palikaris et al, "Excimer Laser in Situ Keratomileusis and Photorefractive Keratectomy for Correction of High Myopia", Journal of Refractive and Corneal Surgery, Sep. 1994, pp. 498–510.

Ren et al, "Corneal Refractive Surgery Using an Ultra–Violet (213nm) Solid State Laser" Ophthalmic Technologies, Jun. 1991, pp. 129–139.

Rozakis, "Refractive Lamellar Keratoplasty" History of Keratomileusis, 1994, Chapt. 1–13.

Seilar et al, "Excimer Laser (193nm) Myopic Keratomileusis in Sighted and Blind Human Eyes" Refractive and Corneal Laser Surgery, Jun. 1990, pp. 165–173.

Steinert et al, "Laser Corneal Surgery", Laser Research Laboratory, 1998, pp. 151–154.

Thompson et al, "Philosophy and Technique for Excimer Laser Phototheraputic Keratectomy", Refractive and Corneal Surgery, Apr. 1993, pp. 81–85.

Trokel et al Excimer Laser Surgery of the Cornea, American Journal of Ophthalmology, Dec. 1983, pp. 710–715.

Trockel et al, "Evolution of Excimer Laser Corneal Surgery", Jul. 1989, pp. 373–381.

Van Mielaert et al, "On the Safety of 193–Nanometer Excimer Laser Refractive Corneal Surgery" Refractive and Corneal Surgery, Jun. 1992, pp. 235–239.

Wilson et al, "Changes in Corneal Topography after Excimer Laser Photorefractive Keratectomy for Myopia", Ophthalmology, Sep. 1991, pp. 1338–1347.

Qiushi Ren, Raymond P. Galitis, Keith P. Thompson, & J.T. Lin, "Ablation of the Cornea and Synthetic Polymers Using a UV (213 nm) Solid State Laser", IEEE Journal of Quatum Electronics, Dec. 1990, pp. 2284–2288.

Conference on Lasers and Electro–Optics, Optical Society of America, May 1990, pp. 28–30.

G.P.A. Malcom, M.A. Persaud, & A.I. Ferguson, "Resonant Frequency Quadrupling of a Mode—Locked Diode—Pumped Nd: YLF Laser", Optics Letters, Jul. 1991, pp. 983–985.

J.T. Lin, J.L. Montgomery, "Temperature—Tuned Noncritically Phase—Matched Frequency Conversion in $LiB_3O_5$ Crystal", Optics Communications, Dec. 1990, pp. 159–165.

A.A. Babin, F.I. Fel'dshtein, & I.V. Yakovlev, "Generation of the Fifth Harmonic of Yttrium Orthoaluminate: $Nd^{3+}$ Laser Radiation in KDP at Room Temperatures", Soviet Technical Physics Letters, Jun. 1990, pp. 417–418.

V.D. Volosov & E.V. Nilov, "Effect of the Spatial Structure or a Laser Beam on the Generation of the Second Harmonic in ADP and KDP Crystals", UDC, Nov. 1965, pp. 715–719.

A.G. Arutyunyan, G.G. Gurzadyan, & R.K. Ispiryan, "Generation of the Fifth Harmonic of Picosecond Yttrium Aluminate Laser Radiation", Soviet Journal Quantum Electron, Dec. 1989, pp. 1602–1603.

Shinichi Imai, Toshitaka Yamada, Yasutomo Fujimori & Ken Ishikawa, Third—Harmonic Generation of an Alexandrite Laser in $\beta$–$BaB_2O_4$, Applied Physics Letters, May 1989, pp. 1206–1208.

* cited by examiner

DEVICE AND METHOD FOR SIMULATING OPHTHALMIC SURGERY

BACKGROUND OF THE INVENTION

The present invention relates to a device and method for reshaping a corneal surface of an eye for refractive correction by laser ablation, and more particularly to a device and method for simulating the reshaping of the corneal surface.

Various lasers have been employed for ophthalmic surgery applications including the treatment of various eye disorders such as glaucoma, cataract, myopia, hyperopia, and astigmatism. In order to correct some of these eye disorders a laser is used to ablate or remove a portion of the corneal surface of an eye in order to reshape the cornea. Typically, such laser refractive surgery is achieved through a plurality of ablated layers, the cumulative affect of the plurality of ablated layers attempting to remove a portion of the cornea to reshape the cornea to correct the curvature of the eye. However, before attempting laser surgery on the cornea, most laser systems in use require the ophthalmologist to practice the ablation on a piece of plastic or metal. Once the practice piece is completed it is necessary to estimate the corresponding depth of ablation in the cornea by using one or more conversion factors. Such conversions or estimates are only approximations and do not completely and accurately determine the depth of ablation. In some situations such estimates are no more than an educated guess that the ablation profile performed on the practice piece will correct an eye disorder in an actual human eye. Additionally, in one available system, the EXCALIBER manufactured by LaserSight Technologies, a visual profile of the ablated cornea is created. However, with the EXCALIBER, a test ablation is still performed on a plastic sample and the profile is created through estimated conversion factors.

It would be advantageous if a simulated ablation profile of a cornea could be constructed or generated without the use of a practice or test piece of synthetic material. The present invention is designed to obviate and overcome many of the disadvantages and shortcomings experienced with the use of a practice piece of material. The present invention eliminates the test ablation on a synthetic material and a computer is used to directly translate actual laser energy pulses into a three dimensional view of corneal stroma ablation. In this manner, the present invention simulates ophthalmic surgery for correcting a disorder of an eye without actually performing surgery on an eye.

SUMMARY OF THE INVENTION

The device for simulating ophthalmic surgery of the present invention comprises laser means for generating a laser beam, an array for sensing whether the laser beam has been projected at the array, and a computer system operatively connected to the laser means and the array, the computer system for actuating the laser means, for determining whether the array has sensed the laser beam, and for creating an ablation profile based upon whether the array has sensed the laser beam.

In another form of the present invention, a device for simulating an ablation profile of a cornea of an eye comprises a laser for producing a laser beam, an array of sensing devices for sensing whether the laser beam has been projected onto any of the sensing devices of the array, and a computer system operatively connected to the laser and the array, the computer system for actuating the laser and for determining whether any of the sensing devices of the array has sensed the laser beam, the computer system further producing a simulated ablation profile for determining whether the simulated ablation profile will correct an abnormal condition of an eye.

In still another form of the present invention, a method of simulating ophthalmic surgery comprises the steps of providing a laser for producing a laser beam, providing an array of sensor devices for sensing whether the laser beam has been projected at the array, and providing a computer system operatively connected to the laser and the array, the computer system for actuating the laser, for determining whether the array has sensed the laser beam, and for creating an ablation profile based upon whether the array has sensed the laser beam.

In light of the foregoing, it will be recognized that a principal object of the present invention is to provide an improved device for simulating ophthalmic surgery for correcting a disorder of an eye.

A further object of the present invention is to provide a device for simulating ophthalmic surgery which can be easily employed with highly reliable results.

Another object of the present invention is to provide a device for simulating ophthalmic surgery which can simulate the ablation profile of the cornea by directly translating actual laser energy pulses into a three dimensional view of the cornea.

A still further object of the present invention is to provide a device for simulating ophthalmic surgery which provides an energy profile which accurately predicts an ablation profile of the cornea and a keratometric appearance of an eye to be treated.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
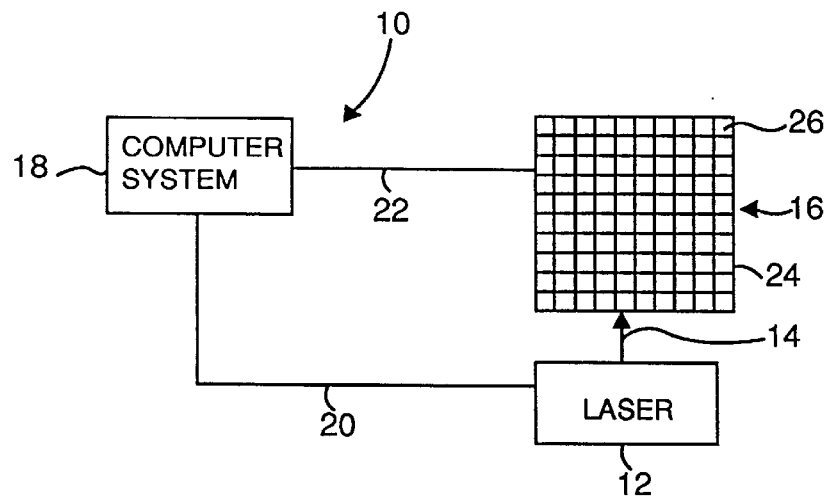
FIG. 1 is a diagrammatic view of a device for simulating ophthalmic surgery constructed according to the present invention.

Referring now to the drawings, wherein like numerals refer to like items, number 10 identifies a preferred embodiment of a device for simulating ophthalmic surgery. The device 10 includes a laser 12 which is operable to produce a laser beam 14 which is directed to an array 16. A computer system 18 is operatively connected to the laser 12 by electrical wires or leads 20 and to the array 16 via leads 22. The energy of the laser beam 14 is measured prior to being directed at the array 16 and this information is stored in the computer system 18. It is assumed that the energy of the laser beam 14 will remain constant. In operation the computer system 18 actuates the laser 12 to produce the laser beam 14 which is directed at the array 16. The array 16 includes a grid 24 of sensing elements 26 which sense whether the laser beam 14 has been directed at a particular element 26 in the grid 24 and the duration of time that the laser beam 14 was sensed by the particular element 26. The elements 26 may be for example, photovoltaic, galvanometric, or electronic sensors and are arranged to each cover a 1 mm$^2$ surface area. For example, when the laser beam 14 strikes the element 26 of the grid 24 a signal is sent over wires 22 to the computer system 18 to indicate that the element 26 sensed the laser beam 14 and the duration of time that the laser beam 14 struck the element 26. With this information and the previously measured energy data, the computer system 18 is able to generate or simulate an ablation profile of the cornea of the eye without having to ablate the cornea or a sample piece such as a piece of plastic or metal. Additionally, the computer system 18 is able to determine if the simulated ablation profile matches a predetermined ablation profile. This allows the device 10 to verify that the simulated ablation profile will successfully correct for an abnormal condition of an eye. Additionally, the computer system 18 is capable of determining the power of the laser beam 14 at each element 26 within the array 16 and the time that the laser beam 14 is sensed by each element 26. Some of the elements 26 within the array 16 will be hit by the laser beam 14 more than once and the computer system 18 is able to record the total energy cumulatively for each element 26 within the array 16. Again, with this information, the computer system 18 can determine the ablation profile and the computer system 18 also creates a three dimensional (3-D) view of the simulated ablation profile. The computer system 18 is used to directly translate actual laser energy pulses into a 3-D view of corneal stromal ablation. The 3-D view allows the ophthalmologist to predict keratometric changes to the cornea to be treated. The 3-D view may also be presented on a monitor (not shown) which is part of the computer system 18. Also, the array 16 tests the alignment of the laser beam 14.

Figure 2:
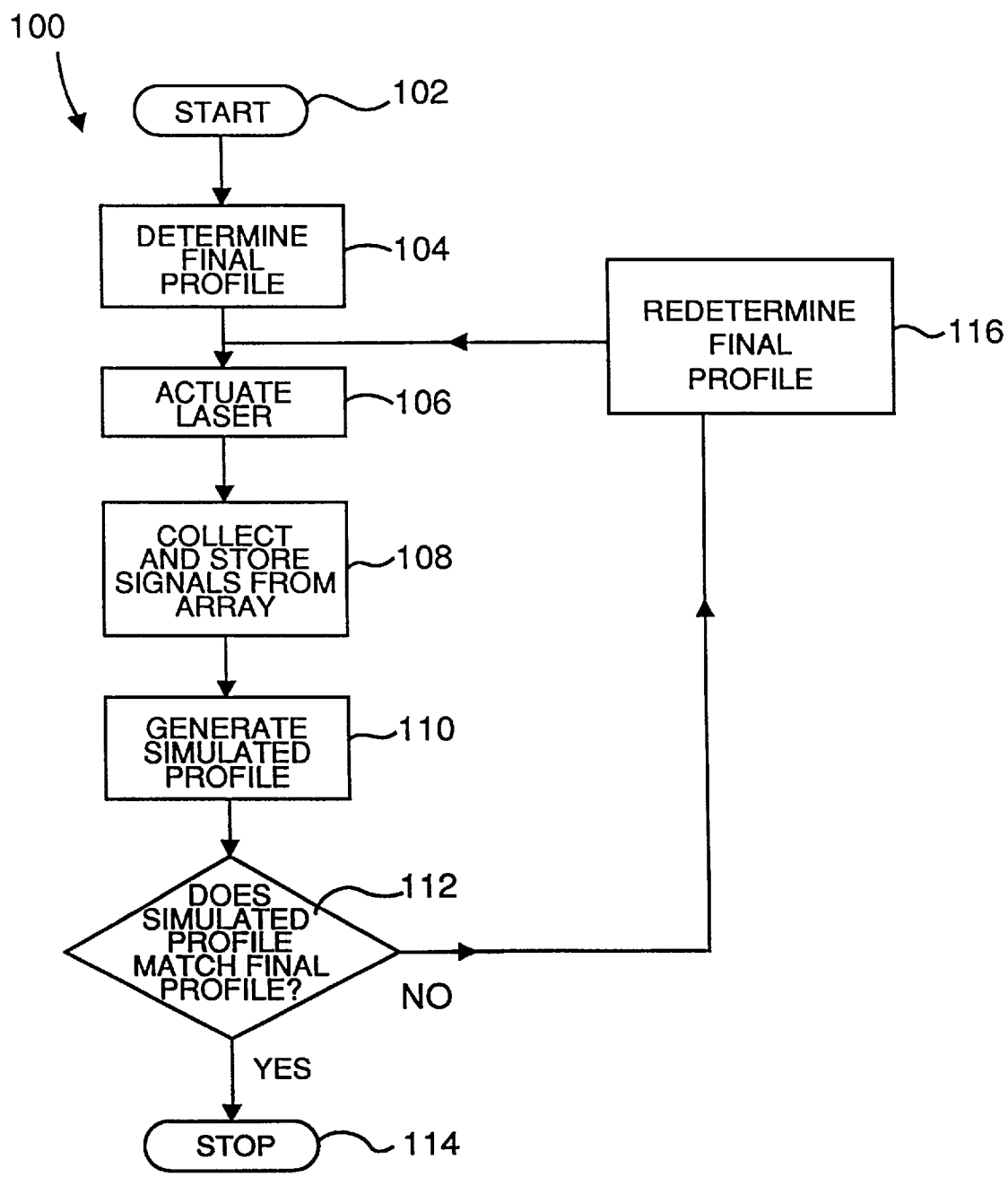
FIG. 2 is a flow chart of a program utilized to control the operation of the device shown in FIG. 1.

The device 10 shown in FIG. 1 is operable to perform the aforementioned procedure according to a program 100 which may be loaded into the computer system 18. An exemplary flow chart of such a program 100 is illustrated in FIG. 2. Referring now to FIG. 2, the control of the program 100 begins at a start step 102 and proceeds to a step 104 which determines the final profile to be ablated from the cornea. Once the final ablation profile has been calculated, control of the program 100 continues to a step 106 in which the laser 12 is actuated to generate the laser beam 14 which is directed at the array 16. At a step 108, signals from the array 16 are sent to the computer system 18 and such signals are stored therein. The program 100 then passes to a step 110 in which a simulated profile of the cornea is generated. In a step 112, the computer system 18 compares the final profile with the simulated profile to determine if it matches within a predetermined limit. If it does, the program 100 branches to a step 114 where the program 100 stops. If, at step 112 it is determined that the final profile and the simulated profile do not match, then control of the program transfers to a step 116. In step 116 a redetermined final ablation profile is calculated. Once calculated, control of the program 100 passes to step 106 until the final profile matches the simulated profile in step 112.

Figure 3:
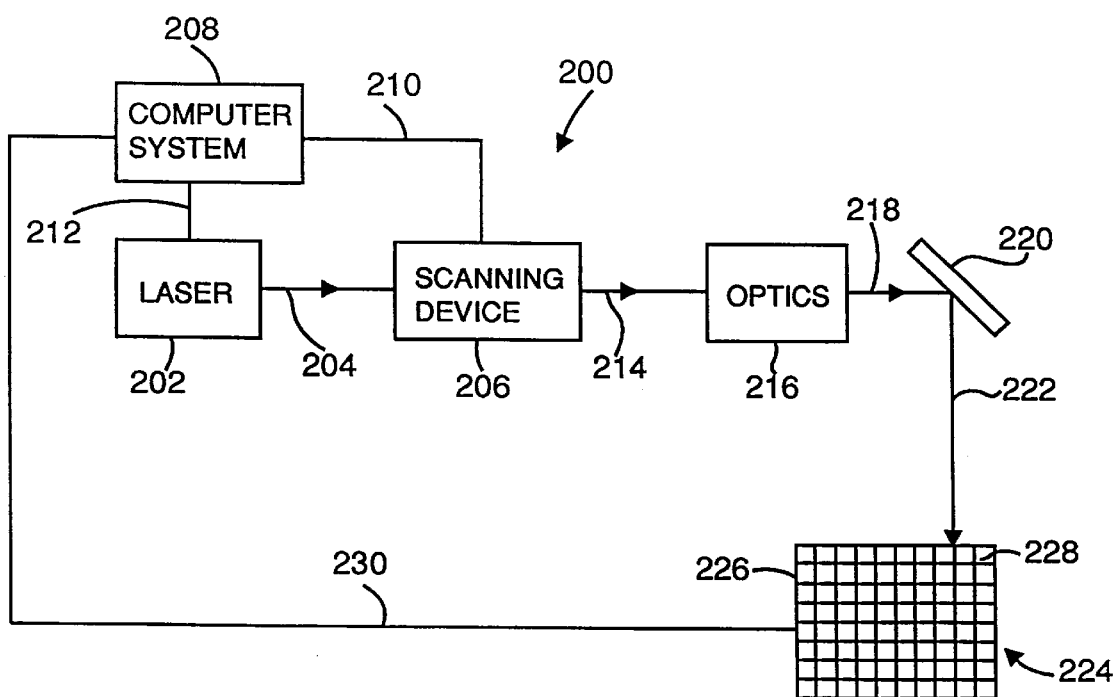
FIG. 3 is a block diagram of a second preferred embodiment of a device for simulating ophthalmic surgery constructed according to the present invention.

FIG. 3 depicts a scanning type laser system 200 which includes a laser 202 which is operable to produce a pulsed output laser beam 204 which is directed to a scanning device 206. The scanning device 206 is operatively connected to a computer system 208 for control thereby, which computer system 208 may be located within the device 200. Such operative connection may be made by way of electrical leads 210. The laser 202 is also connected to the computer system 208 via electrical wires 212 with the computer system 208 controlling the laser 202. A scanned beam 214 departs from the scanning device 206 and is directed to other optics components 216 which may be utilized for shaping the scanned beam 214. A shaped scanned beam 218 is directed to a reflecting mirror 220 and a reflected beam 222 is directed onto an array 224. The scanning device 206 is operated to control the scanning of the pulsed output laser beam 204 across the array 224. The array 224 comprises a grid 226 of sensing elements 228 which are arranged in a rectangular fashion. The computer system is connected to the array 224 by leads 230. The computer system 208 is used to actuate the laser 202 to produce the reflected beam 222 onto the array 224. Once the beam 222 hits any element 228 within the grid 226, a signal is sent over the leads 230 and stored in the computer system 208. Information concerning all of the elements 228 which were hit, how long, and how often, is used by the computer system 208 to simulate an ablated cornea. Each pulse of the laser beam 222 is recorded by the computer system 208 and the total energy is cumulatively stored for each element 228 within the grid 226 of the array 224. The computer system 208 is used to directly translate actual laser energy pulses into a 3-D view of corneal stromal ablation. The 3-D view allows the ophthalmologist to easily predict keratometric changes to the cornea to be treated.

Figure 4:
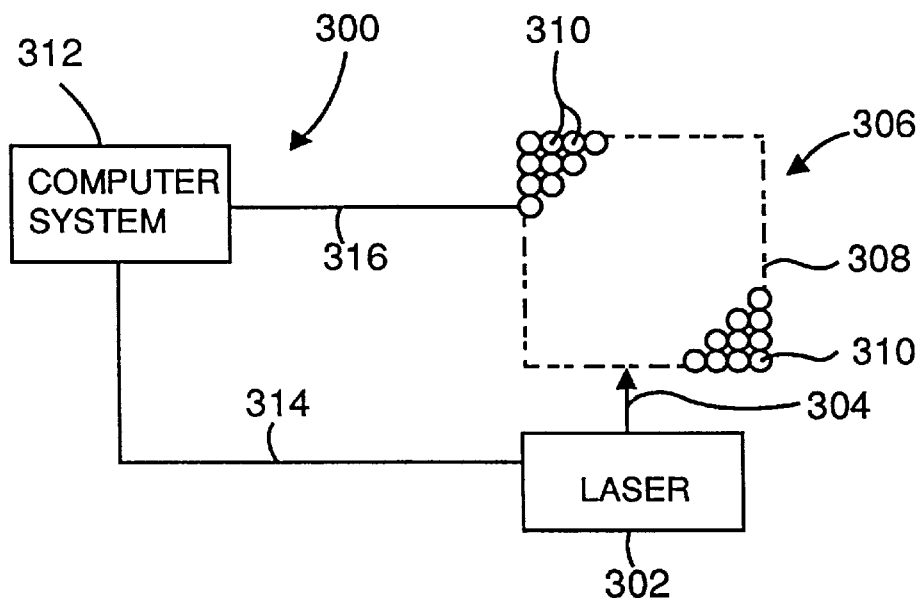
FIG. 4 is a diagrammatic view of a third preferred embodiment of a device for simulating ophthalmic surgery having a fiber optic grid.

With reference now to FIG. 4, a third preferred embodiment or device 300 of the present invention is shown. The device 300 includes a laser 302 which may be actuated to produce a laser beam 304 which is directed at an array 306. The array 306 consists of a grid 308 of a bundle of fiber optic elements 310. The fiber optic elements 310 are adapted to sense or receive the laser beam 304. The fiber optic elements 310 are flexible and tubular in shape and are capable of transmitting light, such as the laser beam 304, which is emitted into one end and out the other end. A computer system 312 is connected to both the laser 302 and the array 306 by leads 314 and 316, respectively. The computer system 312 is used to control the operation of the laser 302 and to receive signals from the array 306 as to whether any of the fiber optic elements 310 has sensed the laser beam 304 and the duration of time that the laser beam 304 was sensed. When the computer system 312 receives the signals from the array 306, the program within the computer system 312 can determine a simulated ablation profile for a cornea. With this information the computer system 312 can determine whether the simulated ablation profile matches a predetermined ablation profile.

Figure 6:
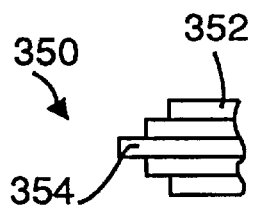
FIG. 6 is a partial cross-sectional view of the fiber optic grid shown in FIG. 5 taken along the plane of line 6—6.
Figure 5:
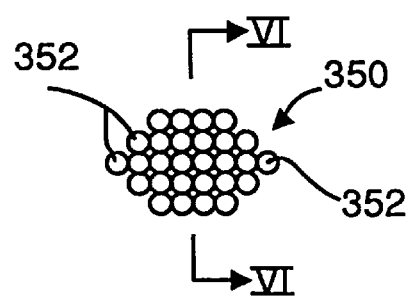
FIG. 5 is a perspective view of another fiber optic grid constructed according to the present invention.

FIG. 5 depicts another fiber optic array 350 which is shaped to simulate a cornea of an eye. The array 350 includes a bundle of fiber optic elements 352 which may be used in the device 300 in place of the array 306. Each fiber optic element 352 is adapted to sense whether the laser beam 304 has been projected at the element 352. Additionally, each element 352 is tubular in shape and capable of transmitting light along its length. The diameter of each element 352 may be for example 1 mm. FIG. 6 is a cross-sectional view of the fiber optic array 350 shown in FIG. 5 taken along the plane of line 6—6. The array 350 is shown to include the bundle of fiber optic elements 352 with each of the elements 352 being positioned to simulate the curvature or the contour of the cornea of the eye. For example, the center fiber optic element 354 is shown as the longest element and projects out from the other elements 352. In this manner, the array 350 can better simulate a cornea of an eye to be ablated.

From all that has been said, it will be clear that there has thus been shown and described herein a device for simulating ophthalmic surgery which fulfills the various objects and advantages sought therefor. It will be apparent to those skilled in the art, however, that many changes, modifications, variations, and other uses and applications of the subject device are possible and contemplated. All changes, modifications, variations, and other uses and applications which do not depart from the spirit and scope of the invention are deemed to be covered by the invention, which is limited only by the claims which follow.

What is claimed is:

1. A device for simulating an ablation of a cornea of an eye, comprising:

at least one sensing device capable of sensing a presence of at least a portion of a laser beam, and a processor adapted to determine whether said at least one sensing device has sensed said presence of said laser beam to create an ablation profile based on, at least in part, a duration of said presence of said laser beam.

2. The device for simulating an ablation of a cornea of an eye according to claim 1, wherein said processor further comprises:

a display to provide a three dimensional view of said ablation profile.

3. The device for simulating an ablation of a cornea of an eye according to claim 1, wherein said at least one sensing device comprises a plurality of sensing elements.

4. The device for simulating an ablation of a cornea of an eye according to claim 3, wherein:

said plurality of sensing elements are arranged in a grid.

5. The device for simulating an ablation of a cornea of an eye according to claim 1, wherein said at least one sensing device comprises:

at least one photovoltaic sensor.

6. The device for simulating an ablation of a cornea of an eye according to claim 1, wherein said at least one sensing device comprises:

at least one electronic sensor.

7. The device for simulating an ablation of a cornea of an eye according to claim 1, wherein said at least one sensing device comprises:

at least one galvanometric device.

8. The device for simulating an ablation of a cornea of an eye according to claim 1, wherein said at least one sensing device comprises:

a bundle of fiber optic elements.

9. The device for simulating an ablation of a cornea of an eye according to claim 8, wherein:

an end of said bundle of fiber optic elements is arranged to simulate a contour of a cornea.

10. A method of simulating an ablation of a cornea of an eye, comprising:

providing an array of sensor devices to sense a presence of a laser beam; and determining whether said array of sensing devices has sensed said presence of said laser beam;

creating an ablation profile based on, at least, a duration of said presence of said laser beam.

11. A method of simulating an ablation of a cornea of an eye, comprising:

determining a first final ablation profile;

irradiating a laser beam on an array of sensing elements in accordance with said first final ablation profile; and constructing a simulated ablation profile based on, at least in part, a duration of irradiation and corresponding irradiated portion of said array of sensing elements.

12. The method of simulating an ablation of a cornea of an eye according to claim 11, further comprising:

comparing said simulated ablation profile with said first final ablation profile.

13. The method of simulating an ablation of a cornea of an eye according to claim 12, further comprising:

determining a second final ablation profile if, based on said comparison of said simulated ablation profile with said first final ablation profile, said simulated ablation profile does not match said first final ablation profile to within a predetermined criteria.

14. The method of simulating an ablation of a cornea of an eye according to claim 13, further comprising:

replacing said first final ablation profile with said second final ablation profile.

15. The method of simulating an ablation of a cornea of an eye according to claim 11, wherein:

said simulated ablation profile is three dimensional.

16. The method of simulating an ablation of a cornea of an eye according to claim 11, further comprising:

displaying said simulated ablation profile.

17. The method of simulating an ablation of a cornea of an eye according to claim 16, wherein:

said simulated ablation profile is displayed in a three dimensional view.

18. A method of simulating an ablation of a cornea of an eye, comprising:

(a) determining a first final ablation profile;

(b) irradiating a laser beam on an array of sensing elements in accordance with said first final ablation profile;

(c) constructing a simulated ablation profile based on, at least in part, a duration of irradiation and corresponding irradiated portion of said array of sensing elements;

(d) comparing said simulated ablation profile with said first final ablation profile;

(e) determining a second final ablation profile to replace said first final ablation profile if, based on said comparison of said simulated ablation profile with said first final ablation profile, said simulated ablation profile does not match said first final ablation profile to within a predetermined criteria; and (f) repeating steps (a) through (e) until said simulated ablation profile matches said first final ablation profile, based on said comparison, to within said predetermined criteria.

19. A method of simulating an ablation of a cornea of an eye, comprising:

determining a final ablation profile which represents a profile of an intended ablation of said cornea;

determining a first energy profile based on said final ablation profile;

irradiating a laser beam on an array of sensing elements in accordance with said first energy profile; and constructing a simulated ablation profile based on, at least in part, a duration of irradiation and corresponding irradiated portion of said array of sensing elements.

20. The method of simulating an ablation of a cornea of an eye according to claim 19, further comprising:

comparing said simulated ablation profile with said final ablation profile.

21. The method of simulating an ablation of a cornea of an eye according to claim 20, further comprising:

determining a second energy profile if, based on said comparison of said simulated ablation profile with said final ablation profile, said simulated ablation profile does not match said final ablation profile to within a predetermined criteria.

22. The method of simulating an ablation of a cornea of an eye according to claim 21, further comprising:

replacing said first energy profile with said second energy profile.

23. The method of simulating an ablation of a cornea of an eye according to claim 19, wherein:

said simulated ablation profile is three dimensional.

24. The method of simulating an ablation of a cornea of an eye according to claim 19, further comprising:

displaying said simulated ablation profile.

25. The method of simulating an ablation of a cornea of an eye according to claim 24, wherein:

said simulated ablation profile is displayed in a three dimensional view.

26. A method of simulating an ablation of a cornea of an eye, comprising:

(a) determining a final ablation profile which represents a profile of an intended ablation of said cornea;

(b) determining a first energy profile based on said final ablation profile;

(c) irradiating a laser beam on an array of sensing elements in accordance with said first energy profile;

(d) constructing a simulated ablation profile based on, at least in part, a duration of irradiation and corresponding irradiated portion of said array of sensing elements;

(e) comparing said simulated ablation profile with said final ablation profile;

(f) determining a second energy profile to replace said first energy profile if, based on said comparison of said simulated ablation profile with said final ablation profile, said simulated ablation profile does not match said final ablation profile to a predetermined criteria; and (g) repeating steps (a) through (f) until said simulated ablation profile matches said first final ablation profile within a predetermined criteria.

27. Apparatus for simulating an ablation of a cornea of an eye, comprising:

means for determining a first final ablation profile;

means for irradiating a laser beam on an array of sensing elements in accordance with said first final ablation profile; and means for constructing a simulated ablation profile based on, at least in part, a duration of irradiation and corresponding irradiated portion of said array of sensing elements.

28. Apparatus for simulating an ablation of a cornea of an eye, comprising:

means for determining a final ablation profile which represents a profile of an intended ablation of said cornea;

means for determining a first energy profile based on said final ablation profile;

means for irradiating a laser beam on an array of sensing elements in accordance with said first energy profile; and means for constructing a simulated ablation profile based on, at least in part, a duration of irradiation and corresponding irradiated portion of said array of sensing elements.

* * * * *